(12) United States Patent
Burns et al.

(10) Patent No.: US 8,415,820 B2
(45) Date of Patent: Apr. 9, 2013

(54) WIND DAM AND VERTICAL TURBINE SYSTEM

(76) Inventors: Timothy Burns, Lubbock, TX (US); Jody Edwards, Lubbock, TX (US)

( * ) Notice: Subject to any disclaimer, the term of this patent is extended or adjusted under 35 U.S.C. 154(b) by 430 days.

(21) Appl. No.: 12/782,446

(22) Filed: May 18, 2010

(65) Prior Publication Data
US 2010/0289265 A1    Nov. 18, 2010

Related U.S. Application Data

(60) Provisional application No. 61/179,199, filed on May 18, 2009.

(51) Int. Cl.
*F03D 9/00* (2006.01)
*H02P 9/04* (2006.01)

(52) U.S. Cl.
USPC .......................................................... 290/55

(58) Field of Classification Search ............... 290/55, 290/44, 54, 43, 52
See application file for complete search history.

(56) References Cited

U.S. PATENT DOCUMENTS

| | | | | |
|---|---|---|---|---|
| 4,926,061 | A * | 5/1990 | Arreola, Jr. | 290/55 |
| 5,009,569 | A * | 4/1991 | Hector et al. | 415/4.1 |
| 6,239,507 | B1 * | 5/2001 | Douthit | 290/55 |
| 6,249,059 | B1 * | 6/2001 | Hosoda | 290/55 |
| 7,368,828 | B1 * | 5/2008 | Calhoon | 290/55 |

* cited by examiner

*Primary Examiner* — Javaid Nasri
(74) *Attorney, Agent, or Firm* — Michael Ries

(57) ABSTRACT

The present invention is a wind dam and vertical turbine system set on a ground surface that captures and directs wind to generate electricity. The system has a wind dam portion with a front opening, an airfoil above the front opening and a vertical turbine portion with a housing disposed on the dam portion's back side with a turbine slide door and actuator. There are also front outriggers with front wheels that are horizontally aligned to the front opening and back outriggers with drive wheels that are horizontally and movably aligned to each end of the back side of the dam portion. There is also a power drive assembly for the vertical turbine and exhaust doors and actuators to expel excessive wind.

20 Claims, 7 Drawing Sheets

WIND DAM AND VERTICAL TURBINE SYSTEM

This application claims priority to U.S. Provisional Application 61/179,199 filed on May 18, 2009, the entire disclosure of which is incorporated by reference.

TECHNICAL FIELD & BACKGROUND

The present invention generally relates to a wind dam and vertical turbine system. More specifically, the invention is a wind dam and vertical turbine system that utilizes an efficient wedge-shaped structure, airfoils and exhaust doors.

At this time, most wind generators are of the horizontal axis type with airplane type propellers for the turbine power. These wind turbines comprise 99% of all commercial wind farms. These turbines are typically placed 200 feet above the ground level. They are very high maintenance because the mechanics have to work above the ground. The cranes that are required to do this are expensive but necessary to work on the generators and turbine blades of these generators. The turbine blades are high maintenance simply because they are so large. The torque the wind places on the propeller hubs causes them to be vulnerable to excessive winds. Even smaller turbines have similar problems. The altitude they need to operate causes them to have limitations such as generator size, propeller blade size and high maintenance costs.

In reference to wind dams even the prior art of U.S. Pat. No. 5,009,569 issued to Hector, has many limitations. Hector had a good idea for capturing the wind but the structure is very limited because it compresses the air from all 4 sides. This idea actually "chokes" the wind down so most of the kinetic energy is lost by the time it gets to the turbine. Also, the small spring loaded doors are not adequate to control excessive wind speeds.

U.S. Pat. No. 7,368,828 issued to Calhoon, also "chokes" the wind down too much. The forced wind will not compress into the tube and by the time it reaches the fourth turbine, the kinetic energy will be zero. And it can't rotate to gain the power from the changing wind direction.

The wind powered machine of U.S. Pat. No. 6,239,507 issued to Douthit also uses a structure that compresses the wind on 4 sides, which causes the wind to be "choked". The relatively small horizontal turbine lacks the surface area on the blades to produce real power. And there is no way to control excessive wind.

The spiral configuration inside the intake tube on U.S. Pat. No. 6,249,059 issued to Hosoda creates friction from the spiral which slows the wind. This structure is again "choked" down from the opening to the rear where the turbine is located. The structure doesn't seem to have any wind control flaps or doors to control any excessive pressure inside the cone.

U.S. Pat. No. 4,926,061 issued to Arreola Jr., does not have a structure to capture the wind. It is basically a turbine standing in the air that has limited power. There is not enough air pressure for the surface area of the blades to produce affordable electricity.

It is an object of the invention to provide a wind dam and turbine with electronic side doors that open and close according to the speed of the incoming wind along with a slide door at the rear of the wind dam that can control the incoming wind in the turbine.

It is an object of the invention to provide a wind dam and turbine system that has controlled doors to release any pressure that is a result of excessive winds.

What is really needed is an operating wind dam and turbine system that has a structure to capture and electronically control the speed of the wind into a vertical turbine along with a unique wedge shaped structure that provides the opportunity to have multiple banks of generators to take advantage of all wind speeds by adding more generating power as the wind speed increases as well as controlled doors to release any pressure that is a result of excessive winds.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
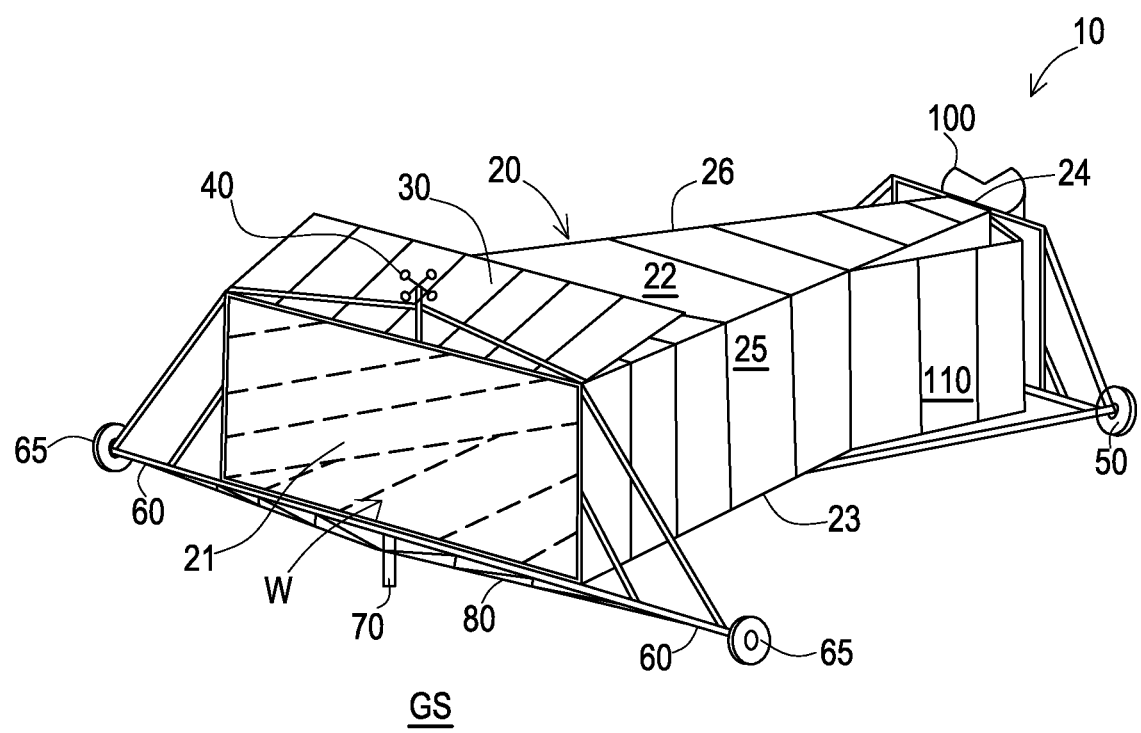
FIG. 1 illustrates a front side perspective view of a wind dam and vertical turbine system, in accordance with one embodiment of the present invention.
Figure 2:
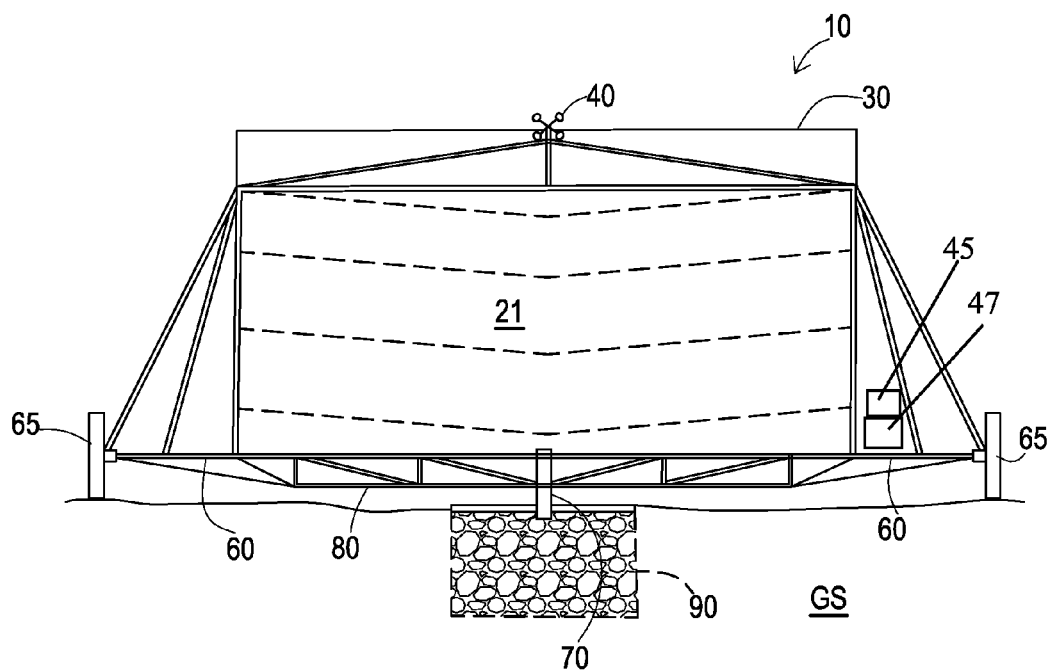
FIG. 2 illustrates a front perspective view of a wind dam and vertical turbine system, in accordance with one embodiment of the present invention.

FIG. 1 illustrates a front side perspective view of a wind dam and vertical turbine system 10, in accordance with one embodiment of the present invention. FIG. 2 illustrates a front perspective view of a wind dam and vertical turbine system 10, in accordance with one embodiment of the present invention. The wind dam and vertical turbine system 10 is set on a ground surface GS that captures and directs wind W to generate electricity. This is different than many wind dams well known in the art that are elevated above the ground. A ground surface is typically the ground itself, but can be any other surfacing on the ground that is well known in the art, such as a concrete or an asphalt pavement surface. Wind W can be any type of exterior wind that is well known in the art, although typically the wind is naturally environmentally occurring wind exterior to the system 10.

There is a wind dam portion 20 with a front opening 21 to receive the wind W, a top side 22, a bottom side 23, a back side 24, two sides 25, 26 and an airfoil 30 above the front opening 21 disposed on the top side 22. The airfoil 30 helps hold the system 10 down to the ground surface GS by providing a downward force across the front of the system 10 to prevent the system 10 from lifting during extremely high winds W. The wind dam portion 20 is wedge shaped, as opposed to cone shaped which is less energy efficient. The wedge shaped dam portion 20 forms a 70 degree wedge angle for greater efficiency as well. An anemometer and wind vane 40 is disposed on the top side 22 above the front opening 21 that sends a signal to a controller 45 that activates the drive motor 47 and the drive wheels 50. There is also a front outrigger 60 with a front wheel 65 that is horizontally aligned to each side of the front opening 21 with a pivot point 70 disposed between the front outriggers 60 underneath the front opening 21. The front outriggers 60 and front wheels 65 are supported by a front brace 80 which provide stability to the system 10. The pivot point 70 is secured and anchored by a large concrete block 90 set in the ground surface GS. The pivot point 70 is a solid steel shaft which allows the entire system 10 to move and pivot around the pivot point 70. There is also a turbine housing 100 and exhaust doors 110, 112 that are described in greater detail in FIGS. 3, 4, 5, 6 and 7 and their descriptions.

Figure 3:
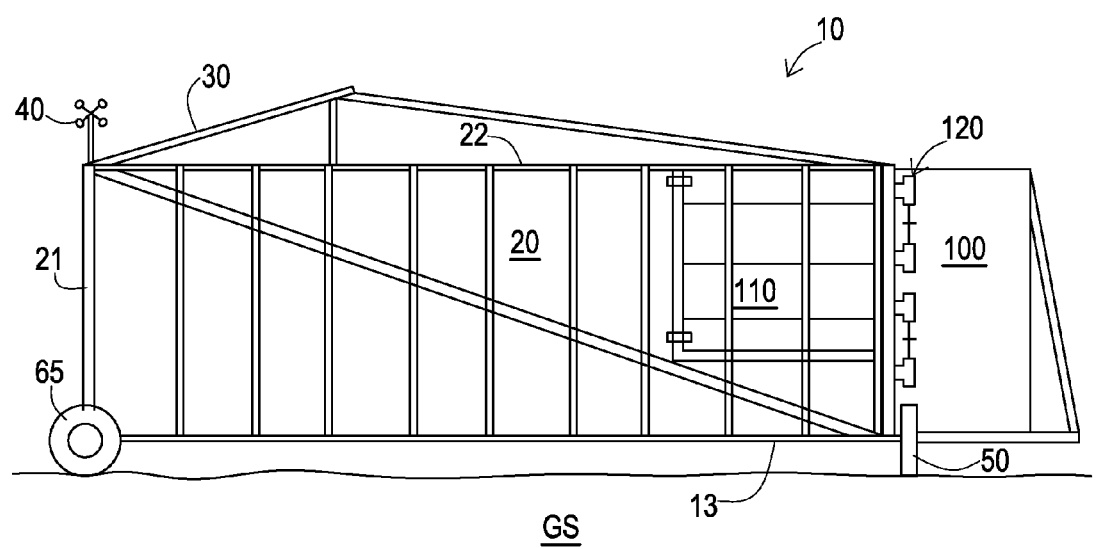
FIG. 3 illustrates a side perspective view of a wind dam and vertical turbine system, in accordance with one embodiment of the present invention.

FIG. 3 illustrates a side perspective view of a wind dam and vertical turbine system 10, in accordance with one embodiment of the present invention. The top side 22 and the bottom side 23 remain parallel to each other from the front opening 21 all the way to the back side 24 of the wind dam portion of the system 20 for energy efficiency. The wind dam portion 20 is wedge shaped, not coned shaped so the wind W that enters will not be choked too much at the back side 24. There is also an exhaust door 110 on each side of the dam portion 25, 26 that allows air pressure to be released when the wind W is excessive, which is further described in FIG. 7 and its description. The airfoil 15 is also opened at a 13 degree angle when in use, which is the best mode angle for the air foil 13. FIG. 3 also illustrates the turbine housing 100 and a power drive assembly 120 that powers the wind dam and vertical turbine system 10, which is described in greater detail in FIG. 6 and its description.

Figure 4:
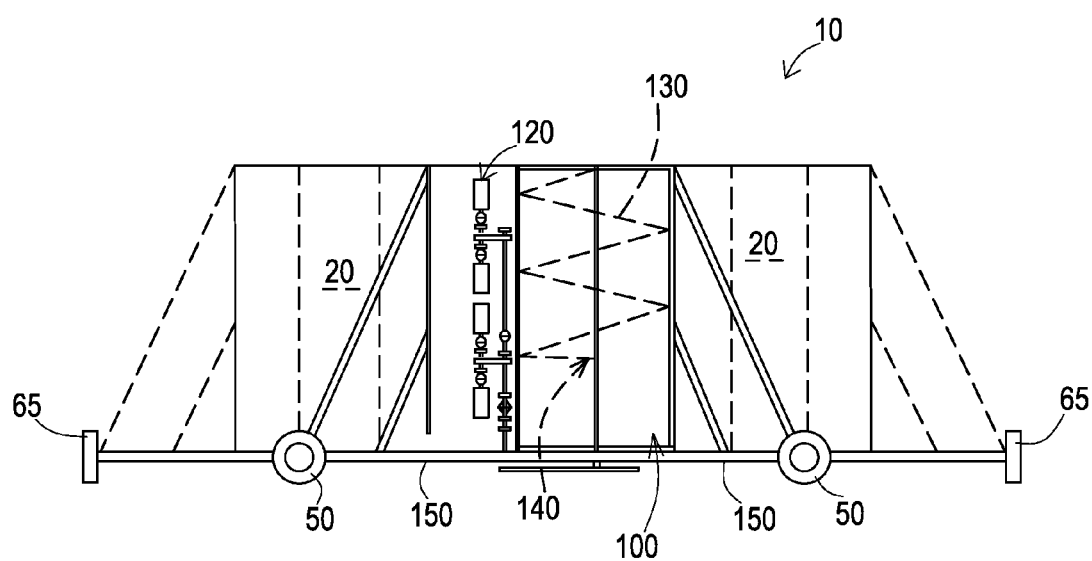
FIG. 4 illustrates a rear perspective view of a wind dam and vertical turbine system, in accordance with one embodiment of the present invention.

FIG. 4 illustrates a rear perspective view of a wind dam and vertical turbine system 10, in accordance with one embodiment of the present invention. The drive wheels 50 are perpendicular to the dam portion 20 and turbine housing 100 to allow for easy movement of the system 10 around the pivot point 70. The turbine housing 100 protects the actual area where the turbine blades 130 are disposed and moving. The turbine blades 130 are the same height as the housing 100, giving the turbine 140 the full surface area of the incoming wind W from the back side of the dam portion 24. The drive wheels 50 move the system 10 so the front opening 21 can be easily moved to face and receive any exterior wind W. A back outrigger 150 is provided with a drive wheel 50 with an axle 55 (FIG. 5) horizontally and movably aligned and adjacently attached to each side of the turbine housing 100, which provide stability for the back side of the dam portion 24.

Figure 5:
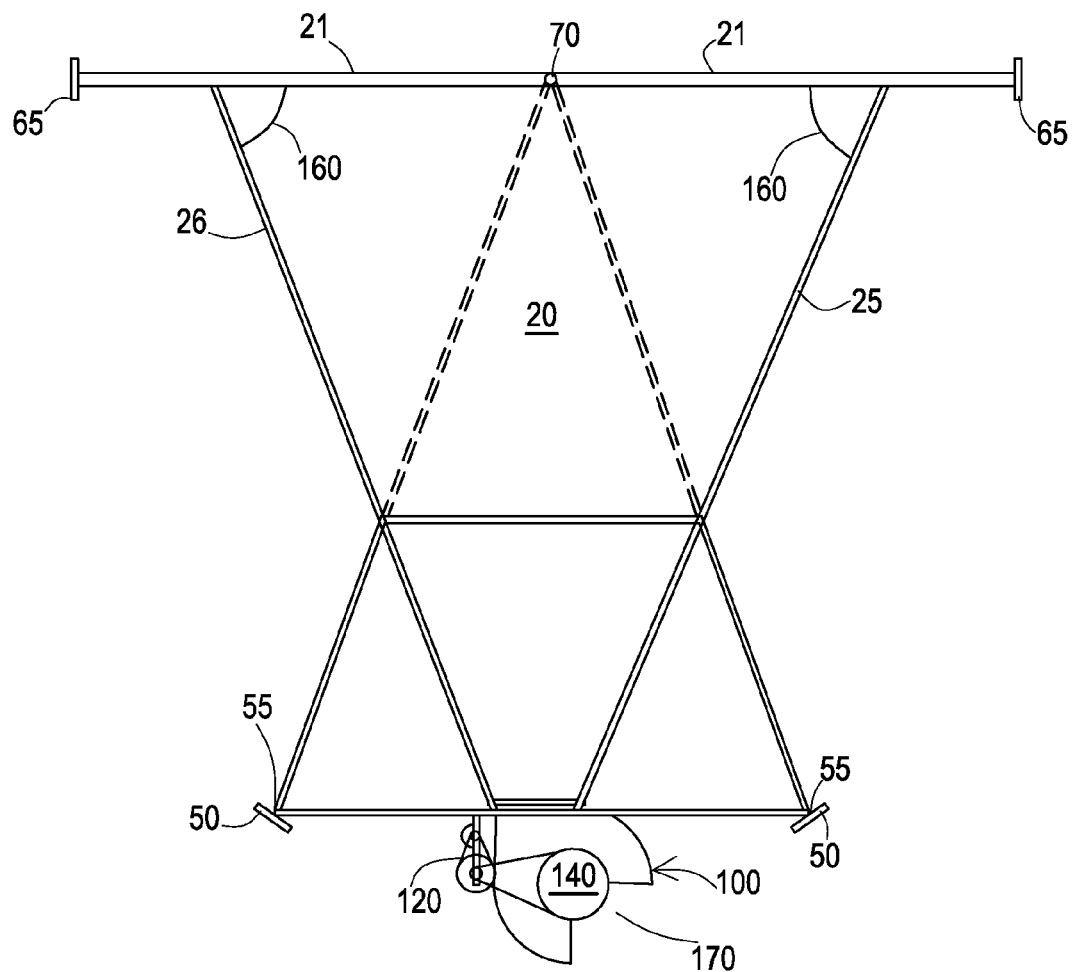
FIG. 5 illustrates an overhead perspective view of a wind dam and vertical turbine system, in accordance with one embodiment of the present invention.

FIG. 5 illustrates an overhead perspective view of a wind dam and vertical turbine system 10, in accordance with one embodiment of the present invention. The angle formed between the front opening 21 and each side of the dam portion 25, 26 is 70 degrees, which was found to be the best mode angle for wind and energy efficiency for the system 10. This is an important difference from the prior art since the wind W can be restricted if this angle is less than 70 degrees. The attachment of the drive wheel axles 55 directly to the back riggers 150 is such that the drive wheels 50 are perpendicular to the front opening 21 of the system 10 to allow for easy pivoted movement around the pivot point 70. FIG. 5 also depicts an exhaust port 170 for the turbine housing 100 that allows for any exhaust from the turbine 140 to be expelled.

Figure 6:
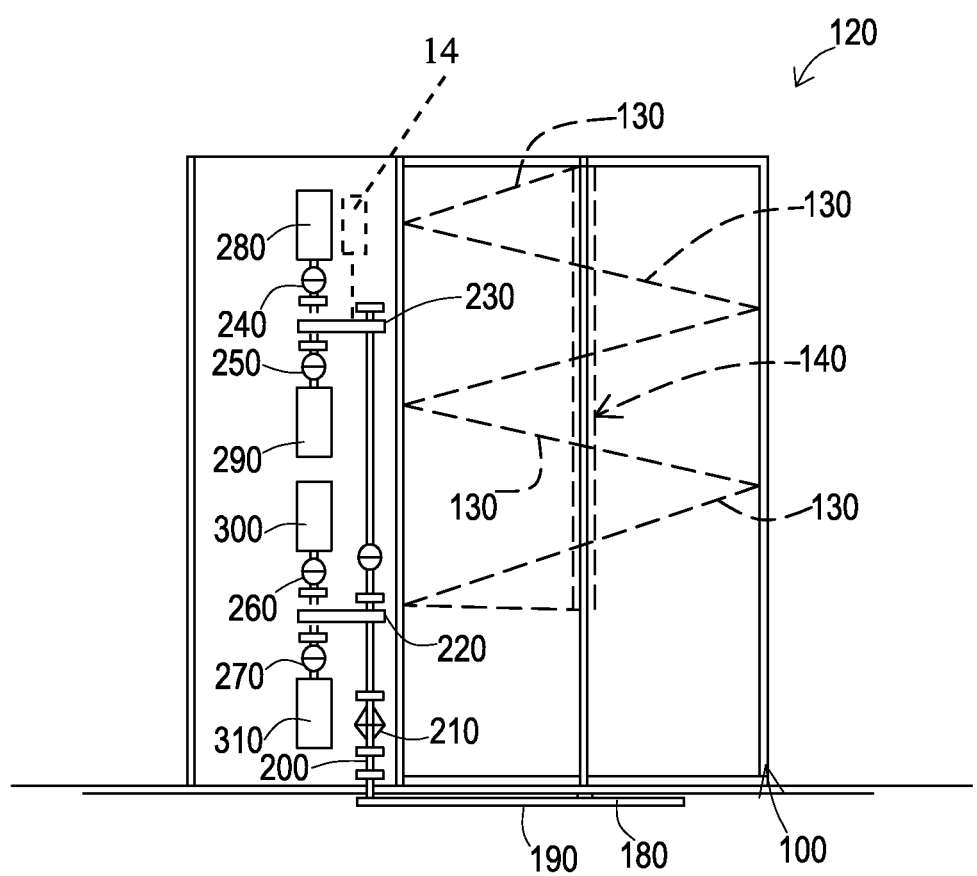
FIG. 6 illustrates a front perspective view of a power drive assembly that powers a wind dam and vertical turbine system, in accordance with one embodiment of the present invention.

FIG. 6 illustrates a front perspective view of a power drive assembly 120 that powers a wind dam and vertical turbine system 10, in accordance with one embodiment of the present invention. The power drive assembly 120 has a turbine 140 that connects to a turbine drive pulley 180 that drives a belt 190 that drives a main shaft 200. An in-line main clutch 210 is provided that serves as the main disconnect clutch to disengage the turbine drive belts 220 and 230 that drive the individual shafts (no numbers) that are connected to a plurality of clutches 240, 250, 260 and 270. These smaller clutches 240, 250, 260 and 270 then turn a plurality of selected generators 280, 290, 300 and 310 to produce electricity. These generators 280, 290, 300 and 310 can be any type of generator used with vertical turbines that is well known in the art. Each individual generator 280, 290, 300 and 310 can be engaged or disengaged according to the wind speed that controls the powering of the power drive assembly 120 and system 10. The height at the back side 24 of the dam portion 20 is the same as the turbine 140 that also allows the turbine 140 to get more square feet of air pressure on its blades 130 for greater efficiency. An air compressor 142 can also be used in place of the generators 280, 290, 300 and 310 if applicable and desired.

Figure 7:
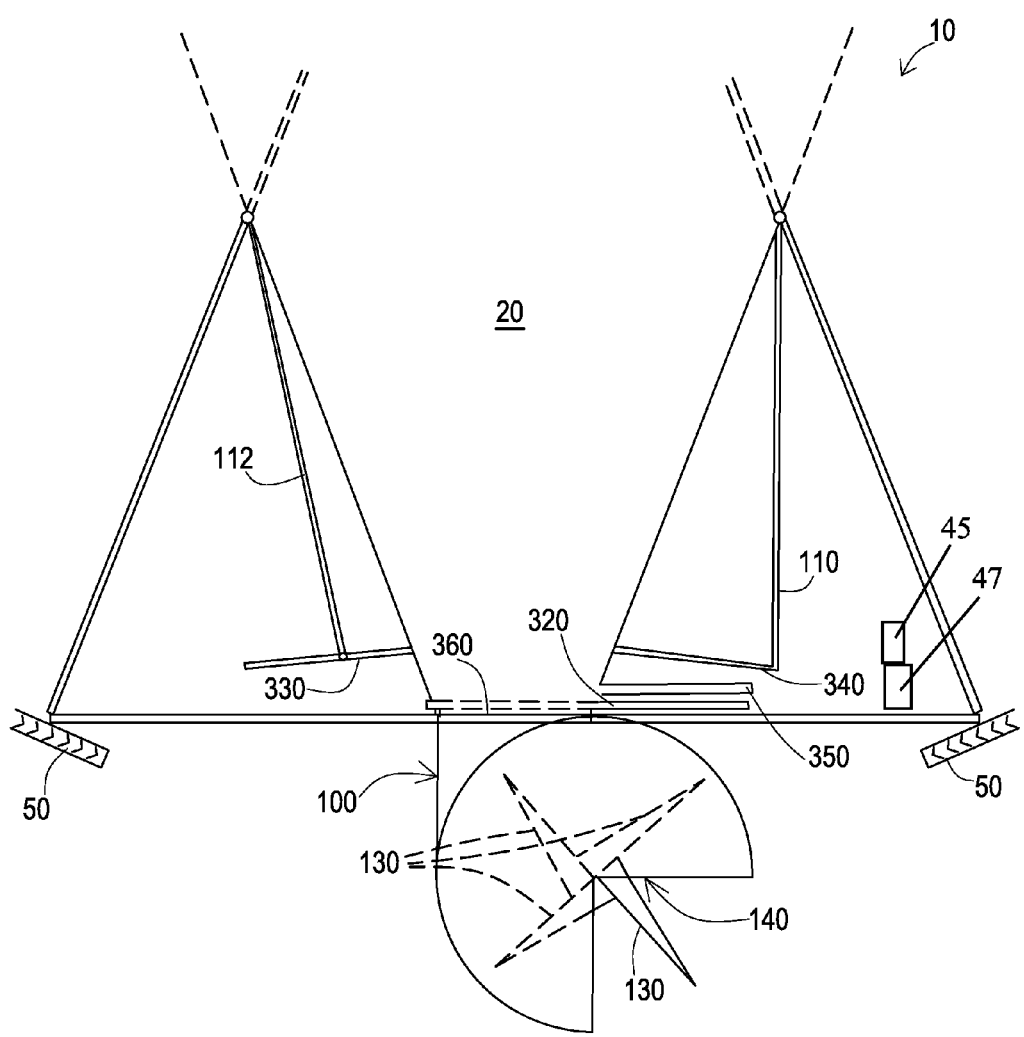
FIG. 7 illustrates an overhead perspective view of exhaust doors and a slide door, in accordance with one embodiment of the present invention.

FIG. 7 illustrates an overhead perspective view of the exhaust doors 110, 112 and a slide door 320 between the back side of the dam portion 24 and the turbine housing 100, in accordance with one embodiment of the present invention. There is a left exhaust door 112, which is 50% open using a first actuator 330 and a right exhaust door 110 which is fully 100% opened using a second actuator 340. Both exhaust doors 110 and 112 are used to release excess wind pressure inside of the wind dam 20. The slide door 320 is used to completely cut off the wind W from the turbine housing 100 with an actuator 350 designed for the sliding door 320. The slide door 92 is typically in the open position and is the same height as the wind dam 20. Also the vertical turbine 140 used in the system 10 is a fixed 4-blade closed vane, vertical axis turbine, although other turbines that are well known in the art may also be used as well. A back outrigger 150 with a drive wheel 50 and an axle 55 is horizontally and movably aligned and adjacently attached to each side of the turbine housing 100. The turbine blades 130 are as wide and as tall as the back side of the wind dam 24 to ensure maximum energy generating potential.

In operation the anemometer and wind vane 40 sends a signal to the controller 45. The controller 45 activates the drive motor 47 which is connected to the drive wheels 50 at the back of the system 10. The drive wheels 50 pivot the system 10 to face the front opening 21 into the wind W at all times. The front opening 21 of the wind dam 20 receives the wind W that passes the compressed sides 25, 26 into a smaller opening at the rear of the dam portion 360 adjacent to the sliding door 320 which then directs the wind W onto the turbine blades 130. The turbine blades 130 then turn the turbine drive pulley 180, which uses two turbine drive belts 220, 230 to turn the main shaft 200. The shaft 200 is connected to a plurality of shafts (not shown) which turns the clutches 240, 250, 260, 270 which turn the selected generators 280, 290, 300, 310 that generate electricity.

As the wind speed increases, the controller 45 will automatically add more generators 280, 290, 300, 310 to the power shaft 200 that the turbine 140 is turning. This will load or slow down and control the turbine 140. After the turbine 140 is fully loaded with all of the generators 280, 290, 300, 310 and if the wind speed continues to increase, the exhaust doors 110 and 112 at the rear of the wedge shaped wind dam 20 will start opening to release the air pressure inside the wind dam 20. If the turbine 140 continues to increase speed, then the sliding door 320 will automatically start closing and shut off any excessive amount of wind W, which will control the speed of the turbine 140.

The vertical turbine 140 can withstand extremely high wind speeds simply because it is secured to the housing 100 at the top and at the bottom of the housing 100. The propeller type turbines used today are secured only at one end which limits the wind speeds in which they can produce electricity. The system 10 can withstand the high winds because it is actually attached to the ground surface GS at a reasonable level, the airfoil 30 provides the needed down force to the front of the system to further secure the system 10 and the exhaust doors 110, 112 allow excessive air pressure to be released outside the system 10.

The wind dam 20 will generate electricity in slow winds because it can choose to use as few as only one of the many generators 280, 290, 300, 310 it has, which reduces the wind power required to produce electricity. It can also generate electricity in very high winds because the turbine 140 can be controlled with the exhaust doors 110, 112 and the slide door 320. An added benefit of the system 10 is that the stronger the wind W, the more electricity the system 10 will produce because it will create enough power to run all the generators 280, 290, 300, 310 at the same time.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A wind dam and vertical turbine system set on a ground surface that captures and directs wind to generate electricity, comprising:
   a wind dam portion with a front opening with two sides to receive said wind, a top side, a bottom side, a back side with two ends, and an airfoil above said front opening;
   a vertical turbine portion with a housing with two sides disposed on said dam portion back side with two sides and a turbine slide door and actuator;
   a front outrigger with a front wheel that is horizontally aligned to each said side of front opening for support with a pivot point disposed between said front outriggers underneath said front opening;
   a back outrigger with a drive wheel and an axle horizontally and movably aligned and adjacently attached to each said end of back side of dam portion for support to allow positioning and movement of said front opening;
   a power drive assembly for said vertical turbine with a turbine drive pulley and a main drive belt attached to a main drive shaft with a main clutch, a plurality of drive belts extending from said drive shaft attached to a plurality of clutches and a plurality of generators and a drive motor; and
   an exhaust door and actuator provided on each said dam portion side disposed behind said turbine housing to expel excessive wind.

2. The system according to claim 1, wherein said wind dam portion is wedge shaped.

3. The system according to claim 2, wherein said wedge shaped dam portion forms a 70 degree angle.

4. The system according to claim 1, wherein an anemometer and wind vane is disposed on said top side above said front opening.

5. The system according to claim 4, wherein said anemometer and wind vane sends a signal to a controller.

6. The system according to claim 5, wherein said controller activates said drive motor and said drive wheels.

7. The system according to claim 1, wherein said top side is parallel to said bottom side over the entire length of said dam portion.

8. The system according to claim 1, wherein said air foil is opened at a 13 degree angle when in use.

9. The system according to claim 1, wherein said pivot point is a solid steel shaft that allows said system to move and pivot around said pivot point.

10. The system according to claim 1, wherein said pivot point is secured by a concrete block set in said ground surface.

11. The system according to claim 1, wherein said housing is provided with an exhaust port and actuator to expel excessive air pressure from said wind.

12. The system according to claim 1, wherein said front outriggers are supported by a front brace.

13. The system according to claim 1, wherein said power drive assembly produces electricity from said generators.

14. The system according to claim 1, wherein an air compressor replaces said generators.

15. The system according to claim 14, wherein said power drive assembly produces electricity from said air compressor.

16. The system according to claim 1, wherein said drive wheels are perpendicular to said front opening.

17. The system according to claim 1, wherein said exhaust door is provided on a left side of said dam portion.

18. The system according to claim 17, wherein said left side exhaust door is 50% opened when actuated.

19. The system according to claim 1, wherein said exhaust door is provided on a right side of said dam portion.

20. The system according to claim 19, wherein said right side exhaust door is fully opened when actuated.

* * * * *